UNITED STATES PATENT OFFICE.

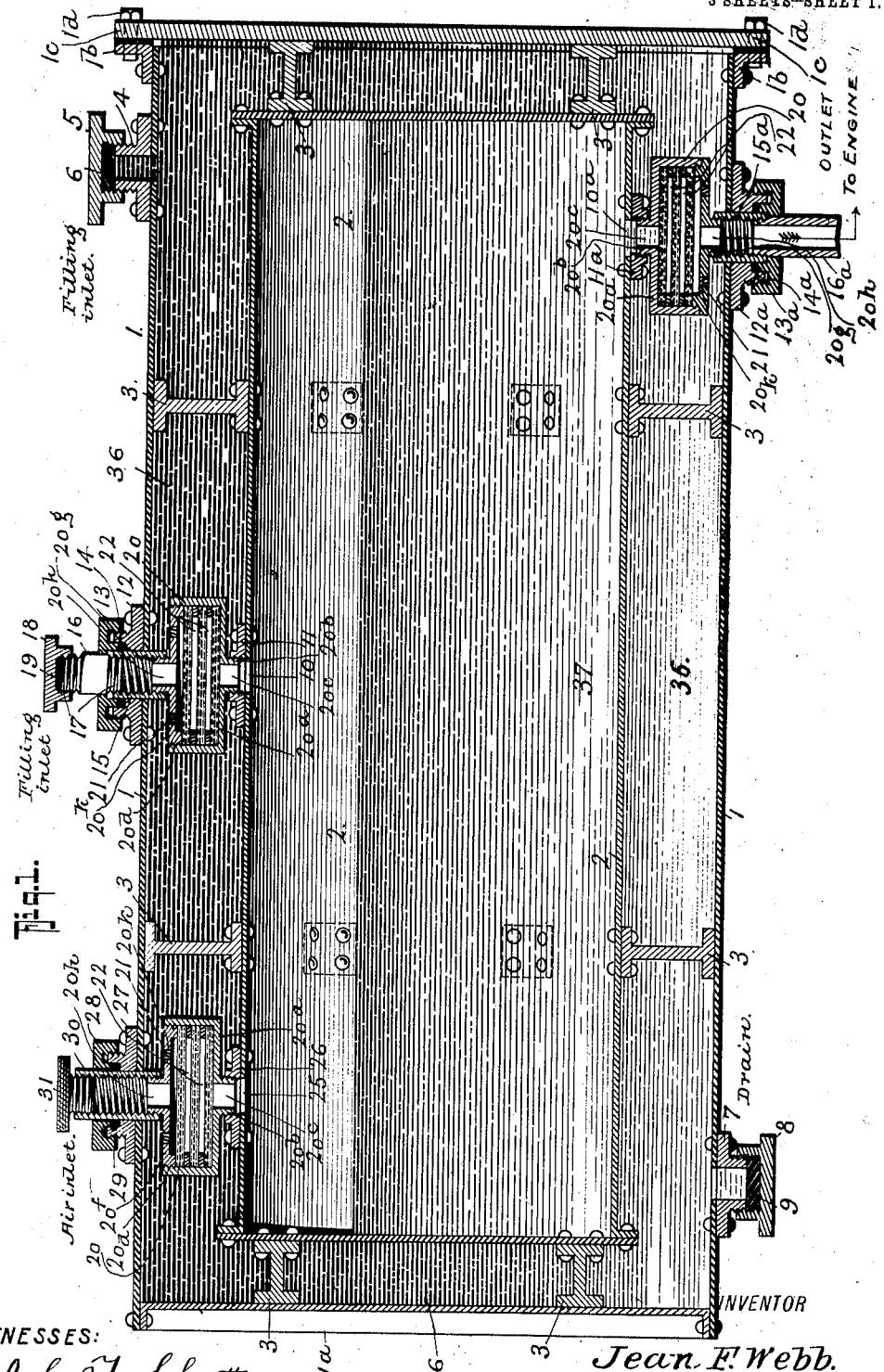

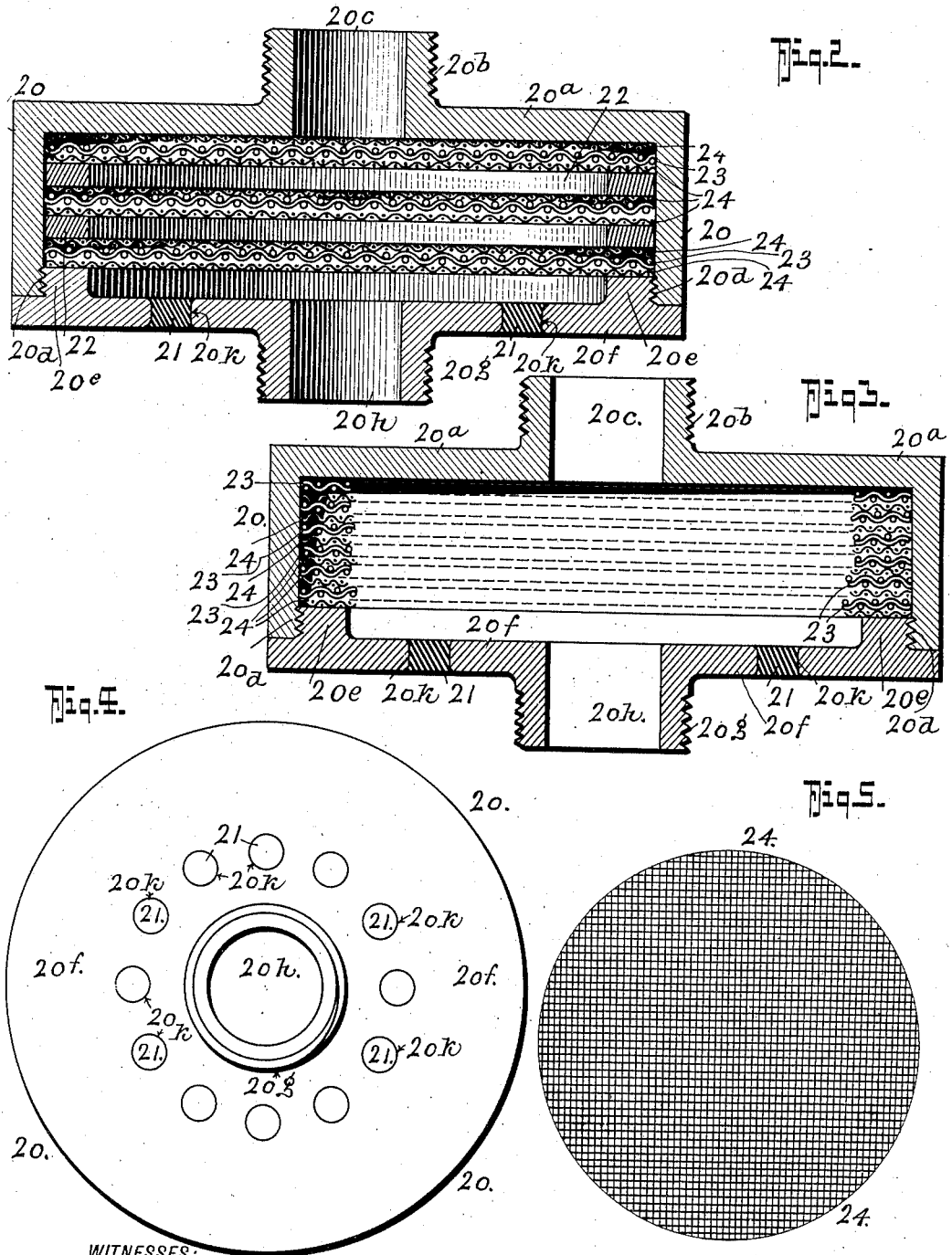

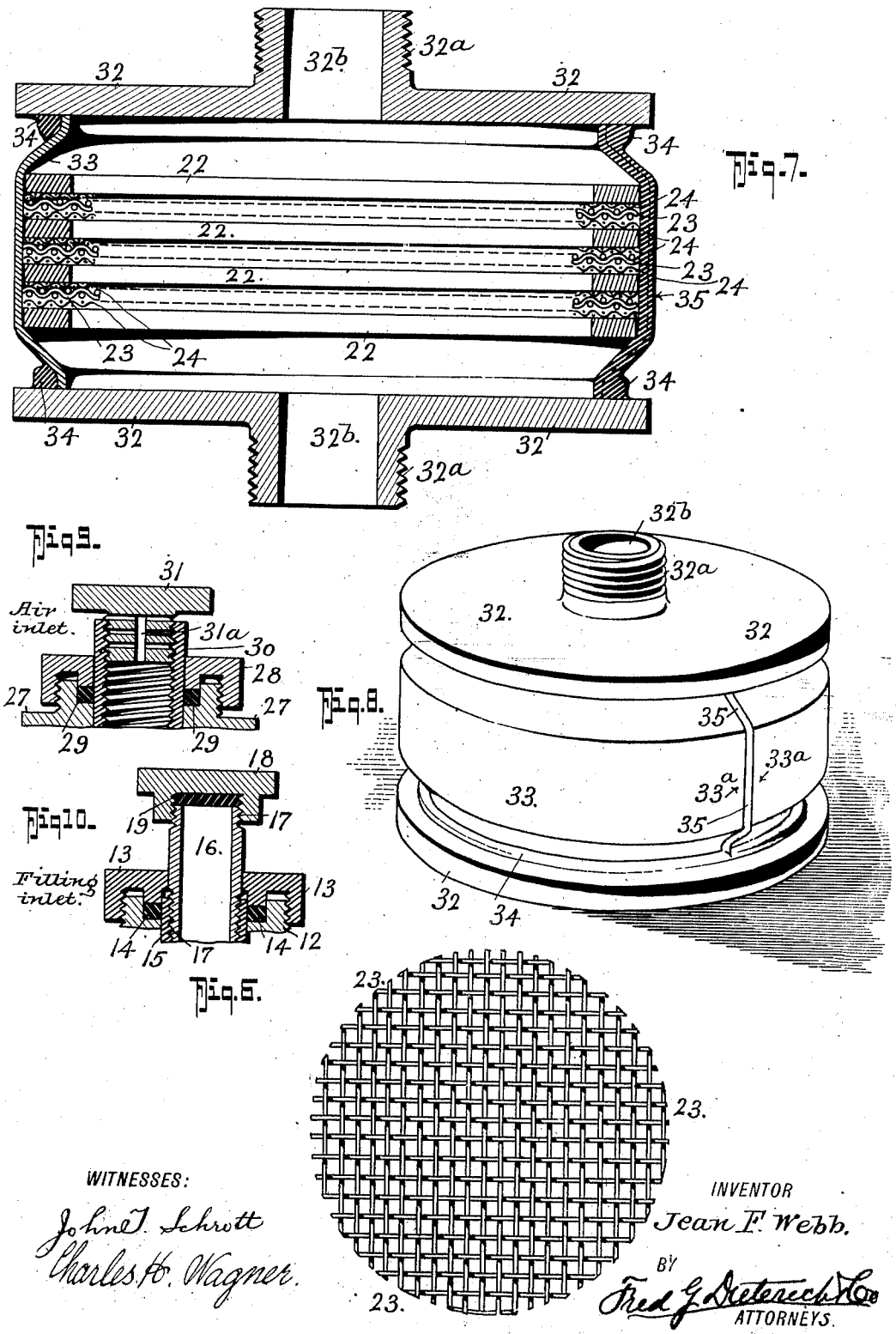

JEAN F. WEBB, OF DENVER, COLORADO.

TANK OR CONTAINER.

1,007,828.   Specification of Letters Patent.   Patented Nov. 7, 1911.

Application filed August 2, 1909. Serial No. 510,711.

*To all whom it may concern:*

Be it known that I, JEAN F. WEBB, residing at Denver, in the county of Denver and State of Colorado, have invented certain new and useful Improvements in Tanks or Containers, of which the following is a specification.

My invention relates to a tank or container for gasolene or other highly inflammable fluids, and the invention primarily has for its object to provide a tank for the purposes stated wherein means are provided for protecting the inlets and outlets to the tank from fire to prevent the ignition of the contents of the tank, and wherein means are also provided in case of the proximity of fire and undue heat, to admit a fire extinguishing compound to the contents of the tank proper to render the contents of the tank non-explosive and non-inflammable.

In the art as practiced today when gasolene and other similar explosive and inflammable fluids are handled, they are kept in a tank of the ordinary construction and it sometimes has been the custom to provide a drip-pan beneath the tank into which the contents of the tank may drop in case of leakage, and from which pan the fluid is conveyed to a place of safety. It has also been the practice in small cans or receptacles for such fluids, to provide means to prevent a flame reaching the interior of the can, and it has further been suggested in practice to provide a double tank, that is, a tank within a tank, whereby the outer tank may receive any leakage from the inner tank. All such devices, however, while useful in so far as they go do not afford the required protection to render them practically successful, since they failed to provide means for protecting the contents of the main tank to the extent required in practice.

In carrying out my invention I provide a main tank for containing the combustible fluid and surround such tank with an outer tank, the inner tank being spaced from the walls of the outer tank and the spaces between the two tanks being filled with a fire extinguishing compound. The conduits which conduct the fluid into the outer and the inner tanks pass through the walls of the outer tank and means are provided in such conduits and located within the outer tank whereby in case of undue heat of the inlet and outlet conduits communication will be opened up between the outer and inner tanks to permit the fire extinguishing compound of the outer tank to flow into the inner tank and by uniting with the contents thereof render the contents of the inner tank non-explosive and non-inflammable, and at the same time the contents of the outer tank will be interposed in the path of the heat or flame from outside of the tanks and cut off the action thereof.

A further object of my invention is to provide means for heat-insulating the main tank which contains the combustible fluid to assist in concentrating any external heat at the inlet and outlet connections, the overheating of which will cause the opening up of communication between the inner and outer tanks for the purposes above stated.

My invention also includes an improved thermostatic valve and fire checking device that is connectible in the inlet and outlet passages to and from the inner tank.

My invention further resides in those novel details of construction, combination and arrangement of parts, all of which will be hereinafter first fully described, then specifically pointed out in the claims and illustrated in the accompanying drawings, in which:—

Figure 1, is a view illustrating the application of my invention to a gasolene tank for use on motor vehicles, motor boats and the like. Fig. 2, is an enlarged central, vertical, longitudinal section of the thermostatic valve and fire checking device. Fig. 3, is a similar view of a slightly modified form of such device. Fig. 4, is an inverted plan view of the mechanism shown in Figs. 2 and 3. Fig. 5, is a detail view of one of the fine mesh screens. Fig. 6, is a similar view of one of the coarse mesh screens. Fig. 7, is a similar view to Figs. 2 and 3, of a further modification of the device. Fig. 8, is a perspective view of the form shown in Fig. 7. Figs. 9 and 10, are detail views of parts of the invention.

I have, for convenience of illustration, shown my invention as adapted for use as a tank for motor boats, motor vehicles and the like, although I wish it understood that the invention may be also used for storage tanks, large stationary containers or small portable containers as circumstances and conditions may warrant and I do not wish to be confined to the particular use of the invention set forth in this specification and the drawings accompanying the same.

Referring now to the accompanying drawings in which like letters and numerals of reference indicate like parts in all of the figures, 1 designates the outer tank which has a closed end head 1ª and a removable head 1ᶜ that is secured to a flange 1ᵇ on the tank 1 by bolts 1ᵈ, as shown, a suitable packing being interposed as indicated in Fig. 1 of the drawings. 2 represents the main or inner tank which is adapted to contain the inflammable fluid and this tank as well as the tank 1 may be of any approved construction, it being spaced from the outer tank 1 by spacing feet or members 3 secured to the tank 2.

4 represents a union flange member secured to the outer tank 1 over the inlet aperture thereto and the flange union 4 is threaded to receive a cap 5 having a packing 6 whereby a tight closure may be effected. On the bottom of the tank 1, a flange union 7, similar to that 4, is provided and a cap 8 and packing 9 are also provided to coöperate with the member 7 to form an outlet for the tank 1.

The inner tank or container 2 has a fluid inlet 10 which is surrounded by a flange union 11 to which the thermostatic valve and flame baffle box 20 is secured, such member 20 being also secured to a pipe 15 which projects through the flange member of a stuffing box or gland 12 that is secured to the top of the tank 1, the flange member of the stuffing box or gland 12 having a cap 13 and a packing 14 to effect an air-tight closure where the pipe 15 passes through the tank 1. Threaded into the pipe 15 and projecting through the cap 13 is a second pipe 16 having threaded portions 17 and adapted to be closed by a cap 18, and a packing 19, as shown, whereby when the cap 18 is removed the fluid may be admitted to the tank 2. I provide a second or air outlet opening 25 in the tank 2 surrounded by a flange union 26 to which a screen baffle box member 20 is connected, and the member 20 is in turn connected to a pipe 30 that passes through the flange member 27 of a second stuffing box or gland, which member 27 has a cap 28 and packing 29 to form a fluid-tight passage for the pipe 30 into which the air escape cap or plug 31 is threaded. The plug 31 may be provided with a series of apertures 31ª so that air may be permitted to enter when the plug 31 is more or less unscrewed, to permit the air to take the place of the contents of the tank 2 when such contents are withdrawn in a manner hereinafter fully explained.

At the bottom the tank 1 is provided with an aperture surrounded by a flange member 12ª of similar construction to that of the member 12, which member 12ª is provided with a cap 13ª and a packing 14ª to form a stuffing box or gland to permit passage of the pipe section 15ª into which the off-take pipe 16ª is threaded and with which another thermostatic valve and flame baffle box 20 is connected, the member 20 being in turn connected to a flange union 11ª that surrounds the outlet aperture 10ª of the tank 2. The construction of the member 20 is best disclosed in Fig. 2 of the drawings, by reference to which it will be seen that I provide a casting 20ª of cup-shape having one end open and threaded at 20ᵈ to receive the threaded flange 20ᵉ of a cap 20ᶠ. The cap 20ᶠ is provided with a threaded extension 20ᵍ, apertured as at 20ʰ, while the casting 20ª has an oppositely disposed threaded member 20ᵇ which is also apertured as at 20ᶜ, the apertures 20ʰ and 20ᶜ preferably lying in alinement.

Within the box formed by the casting 20ª and cap 20ᶠ, I place a pair of spacing rings 22 between which and the walls of the box 20 a plurality of wire screens 23—24 are disposed. The screens 23 are of heavy mesh, while those 24 are of fine mesh, and the fine mesh screens are spaced apart from one another by interposing the heavy mesh screens 23 between them, as indicated. The number of screens 23—24 and rings 22 that may be used in the member 20 will vary as conditions may make necessary, and I do not desire to be limited to any specific number.

The member 20 when used simply as a flame check is constructed as just described, but when it is to perform the additional function of a thermostatic valve the cap 20ᶠ is apertured as at 20ᵏ, which apertures are filled with soft solder 21, or other substance which will melt at a low temperature.

If desired, I may omit the spacing rings 22, as indicated in Fig. 3 of the drawings, and simply use alternate layers of fine mesh screen 24 and heavy mesh screen 23, as shown.

In the forms of my invention shown in Figs. 7 and 8 of the drawings, I provide a pair of disks 32 each having a central projected threaded portion 32ª having a bore 32ᵇ preferably alining with one another. Between the disks 32 a strip of metal 33 is bent into ring-like form and has its ends 33ª—33ª soldered together as at 35, while the edges of the strip 33 are soldered to the disks 32, as at 34, to form a housing for the spacing rings 22, and the screens 23 and 24, it being understood that the solder 34—35 is soft solder that will readily melt at a given temperature.

In the practical application of my invention, as a gasolene tank, the tank 1 is filled with a fire extinguishing compound 36 that may consist of any substance, either fluid or viscous, that will render the gasolene 37 non-explosive or non-inflammable, as may be desired. Any well known fire extinguishing compound 36 may be used that will perform the function stated. In the operation should fire surround the tank 1, the contents of the tank 2 will be protected from such fire by the fluid contents 36 of the tank 1, since the fluid 36 will not conduct the heat as rapidly as metal. Therefore the metallic connections at the inlet and outlet openings to the tank 2 by conducting the heat at a greater speed than the contents 36 of the tank 1 will cause the soft solder 21 to melt and permit a part of the contents 36 of the tank 1 to flow through the openings 20$^k$ into the member 20 and immerse the screens, at the same time flowing into the tank 2 and render the contents 37 thereof non-explosive or non-inflammable, as the case may be. Should a sudden heating of the tanks take place, as in the case of an explosion adjacent to the tank or flame passing into any of the inlet or outlet openings to the tank 2, such flame will be stopped by the screens 23 and 24 on the well known principle of the "Davy lamp," while at the same time if the heat is sufficient, the solder 21 will be melted and the fire extinguishing compound 36 will be permitted to enter the baffle boxes 20 and the tank 2, as required. It will also be observed that by constructing a tank on the lines indicated in the drawings, the parts may be readily assembled or taken apart, and by providing the fire extinguishing compound 36 in the outer tank 1, should any leakage take place in the tank 2 the contents 37 of such tank by contact with the fire extinguishing compound 36 at the point of leakage will be rendered non-explosive or non-inflammable.

As before stated I have shown my invention as adapted for use on motor vehicles, motor boats and the like yet my invention may be readily adapted for use wherever it is found necessary to store or pack inflammable fluids and the like.

From the foregoing description taken in connection with the accompanying drawings, it is thought the complete construction, operation and numerous advantages of my invention will be readily understood by those skilled in the art to which the invention appertains.

What I claim is:

1. In an apparatus of the character stated, a tank comprising a closed inner and an outer container, fluid inlet and outlet conduits to the inner container, a relatively poor conductor of heat interposed between said containers to concentrate external heat in the conduits, and means for admitting said poor conductor of heat from said outer container into said inner container upon the rising in the temperature above a predetermined degree in said conduits.

2. In an apparatus of the character stated, a tank comprising an inner and an outer container, fluid inlet and outlet conduits to the inner container, a relatively poor conductor of heat interposed between said containers to concentrate external heat in the conduits, and means in said conduits for opening up communication between said inner and outer containers.

3. A tank comprising an outer container and an inner container, conduits passing through said outer container and communicating with said inner container, flame baffle boxes included in said conduits between said containers, and a heat insulating material within said outer container and surrounding said baffle boxes.

4. A tank comprising an inner and an outer container, conduits passing through said outer container and communicating with said inner container, and flame baffle boxes included in said conduits and located within the outer container.

5. A tank comprising an inner and an outer container, conduits passing through said outer container and communicating with said inner container, flame baffle boxes included in said conduits, a fluid in said outer container, and thermally controlled means for opening communication between said inner and outer containers.

6. A tank comprising an inner and an outer container, conduits passing through said outer container and communicating with said inner container, flame baffle boxes included in said conduits and located within the outer container, a fluid in said outer container, and thermally controlled means for opening communication between said inner and outer containers.

7. A tank comprising an inner and an outer container, conduits passing through said outer container and communicating with said inner container, flame baffle boxes included in said conduits and located within the outer container, and thermally controlled means for opening said flame baffle boxes to open communication between the inner and outer containers.

8. An apparatus of the class described comprising a tank formed of an inner and an outer container, means for spacing the inner container from the walls of the outer container, a fire extinguishing compound within the space between said containers, inlet and outlet conduits for said inner container passing through said outer container, and means interposed in said conduits for opening communication between the inner and outer containers.

9. An apparatus of the class described comprising a tank formed of an inner and an outer container, means for spacing the inner container from the walls of the outer container, a fire extinguishing compound within the space between said containers, inlet and outlet conduits for said inner container passing through said outer container, means interposed in said conduits for opening communication between the inner and outer containers, and flame baffling or checking devices also interposed in said conduits.

10. An apparatus of the class described comprising a tank formed of an inner and an outer container, means for spacing the inner container from the walls of the outer container, a fire extinguishing compound within the space between said containers, inlet and outlet conduits for said inner container passing through said outer container, means interposed in said conduits for opening communication between the inner and outer containers, and said outer container having a filling opening and a draining opening.

11. An apparatus of the class described comprising a tank formed of an inner and an outer container, means for spacing the inner container from the walls of the outer container, a fire extinguishing compound within the space between said containers, inlet and outlet conduits for said inner container passing through said outer container, means interposed in said conduits for opening communication between the inner and outer containers, flame baffling or checking devices also interposed in said conduits, and said outer container having a filling opening and a draining opening.

12. An apparatus of the character stated comprising an inner and an outer container, and spacing means for spacing said containers apart, a fire extinguishing compound filling the space between said containers, means through which said compound may be introduced into said outer container, conduits passing through said outer container and communicating with said inner container, and flame baffle boxes connected in said conduits within the outer container.

13. An apparatus of the character stated comprising an inner and an outer container, and spacing means for spacing said containers apart, a fire extinguishing compound filling the space between said containers, means through which said compound may be introduced into said outer container, a conduit passing through said outer container and communicating with said inner container, a flame baffle box connected in said conduit within the outer container, and surrounded by the fire extinguishing compound within the outer container.

14. An apparatus of the class described comprising a tank formed of an inner and an outer container, means for spacing the inner container from the walls of the outer container, a fire extinguishing compound within the space between said containers, inlet and outlet conduits for said inner container passing through said outer container, means interposed in said conduits for opening communication between the inner and outer containers, said outer container having a filling opening and a draining opening.

15. An apparatus of the class described comprising a tank formed of an inner and an outer container, means for spacing the inner container from the walls of the outer container, a fire extinguishing compound within the space between said containers, inlet and outlet conduits for said inner container passing through said outer container, means interposed in said conduits for opening communication between the inner and outer containers, flame baffling or checking devices also interposed in said conduits, said outer container having a filling opening and a draining opening.

16. An apparatus of the character stated comprising an inner and an outer container, and spacing means for spacing said containers apart, a fire extinguishing compound filling the space between said containers, means through which said compound may be introduced into said outer container, conduits passing through said outer container and communicating with said inner container, flame baffle boxes connected in said conduits within the outer container, and means for opening communication between said conduits and the interior of said outer container.

17. An apparatus of the character stated comprising an inner and an outer container, and spacing means for spacing said containers apart, a fire extinguishing compound filling the space between said containers, means through which said compound may be introduced into said outer container, conduits passing through said outer container and communicating with said inner container, flame baffle boxes connected in said conduits within the outer container, and surrounded by the fire extinguishing compound within the outer container, and means for opening communication between said conduits and the interior of said outer container.

18. In an apparatus of the character stated, a flame baffle device comprising a receptacle or box having an inlet and an outlet and a series of alternately disposed fine and coarse mesh screens within said box and in contact with one another.

19. In an apparatus of the character stated, a combined thermostatic valve and flame baffling device comprising a receptacle or box having an inlet and an outlet, a series of alternately disposed fine and coarse mesh screens within said box and in contact with one another, said box having apertures and a filler for said apertures having a low melting point.

20. A flame baffle box comprising a cup-like body having an inlet and a cap threaded into said cup-like body, said cap having a passage, a plurality of sets of screens within said box, spacing rings interposed between certain of said sets, each of said sets comprising a plurality of alternately disposed fine and coarse mesh screens, substantially as shown and described.

21. A flame baffle box and thermostatic valve comprising a cup-like body and a cap therefor, a flame baffling screen mounted within said body, said body and said cap having passages, said box having apertures, and plugs of a material of lower melting point than the material of the box proper filling said apertures.

22. A tank comprising an outer container including a removable head and a closed container removably held within said outer container and spaced from the walls thereof, conduits passing through the outer container to communicate with the inner container, and means for opening said conduits to open up communication between the outer and inner containers under predetermined conditions.

23. A tank comprising an outer container having a removable head and an inner container removably held within said outer container and spaced from the walls thereof, conduits passing through the outer container to communicate with the inner container, said outer container having filling and draining ports, glands surrounding said conduits for the inner container, and means for opening said conduits within the outer container to open up communication between the outer and inner containers.

24. A tank comprising an inner and an outer container, a conduit passing through said outer container and communicating with said inner container, and means in said conduit for opening communication under predetermined conditions between said inner and outer containers.

25. A tank comprising an inner and an outer container, a conduit passing through said outer container and communicating with said inner container, a flame baffle box included in said conduit and located within said outer container and thermally controlled means for opening said baffle box to establish communication between the inner and outer containers.

26. A tank comprising an inner and an outer container, a conduit passing through said outer container and communicating with said inner container, a flame baffle box included in said conduit and located within said outer container, thermally controlled means for opening said baffle box to establish communication between the inner and outer containers, and a fluid in said outer container and immersing said inner container.

JEAN F. WEBB.

Witnesses:
  GRACE I. HICKOK,
  FLOYD F. WALPOLE.